United States Patent Office 3,719,522
Patented Mar. 6, 1973

3,719,522
VINYL RESIN AND ACRYLIC RUBBER-URE-
THANE-ACRYLATE PAINT AND PAINTING
PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,496
Int. Cl. C08g 41/04
U.S. Cl. 117—93.31                15 Claims

ABSTRACT OF THE DISCLOSURE

A radiation-curable paint binder dispersion comprises vinyl monomers, an alpha-beta olefinically unsaturated vinyl resin having molecular weight in excess of about 1,000 and, an addition product of a hydroxy-functional acrylic rubber particle, a diisocyanate and a hydroxyalkyl acrylate. The dispersion is applied to substrates and cured thereon by exposure to ionizing radiation, e.g., an electron beam.

---

A unique, rubber-comprising, radiation-curable paint is provided by preparing a film-forming dispersion of vinyl monomers, an alpha-beta olefinically unsaturated vinyl resin, and the addition product of a hydroxy-functional acrylic rubber particle, a diisocyanate and a hydroxyalkyl acrylate. The dispersion is applied to substrates, e.g., wood, metal, glass, shaped polymeric solid, etc., and cured thereon by ionizing radiation, e.g., an electron beam.

(I) THE VINYL RESIN COMPONENT

The alpha-beta olefinically unsaturated vinyl resins used herein have average molecular weight in excess of about 1,000, advantageously in the range of about 5,000 to about 15,000.

The vinyl resin employed herein may be prepared by various methods all of which, in at least one preparation step, involve the copolymerization of vinyl monomers. At least a major portion of the constituent monomers are acrylic monomers or a continuation of acrylic monomers and vinyl hydrocarbon monomers. A minor proportion of the constituent monomers may be other than vinyl monomers, e.g., allylic compounds.

In a preferred embodiment, the copolymers consists essentially of the polymerization product of acrylic monomers. The term "acrylic monomer" as used herein means acrylic acid, methacrylic acid, monoesters of acrylic acid or methacrylic acid and a $C_1$–$C_8$ monohydric alcohol, e.g., methyl methacrylate, ethyl acrylate, butyl acrylate, methyl methacrylate, hexyl acrylate, 2-ethyl hexyl acrylate, etc., and oxygenated or oxygen substituted derivatives of acrylic or methacrylic acid, e.g., glycidyl methacrylate, hydroxyethyl acrylate, hydroxyethyl methacrylate, hydroxypropyl acrylate, hydroxypropyl methacrylate, etc. The aforementioned oxygenated or oxygen substituted derivatives of acrylic or methacrylic acid, when employed, will comprise about 1 to about 30 mole percent of the vinyl copolymer. Other acrylic monomers which may be employed, as hereinafter illustrated, will include acrylyl chloride and methacrylyl chloride.

The vinyl hydrocarbons which may be employed with the acrylic monomers are preferably $C_8$–$C_9$ vinyl hydrocarbons such as styrene, alpha methyl styrene, vinyl toluene, etc.

The vinyl resins employed herein have alpha-beta olefinic unsaturation. The concentration of alpha-beta olefinic unsaturation units per 1,000 units molecular weight is broadly in the range of about 0.5 to 5, preferably in the range of about 0.7 to 3.5, units per 1,000 units molecular weight.

(II) PREPARATION OF THE ACRYLIC RUBBER PARTICLE

The acrylic rubber particle is a crosslinked, elastomeric, acrylic polymer having hydroxy functionality.

These particles can be prepared in either an aqueous or organic medium.

In one method of preparation, a major amount of monoacrylate is emulsion copolymerized with a crosslinking amount of a di- or tri-functional monomer containing 2 or more non-conjugated terminal ethylenic groups, preferably a diacrylate, using a water-soluble free radical initiator and a suitable surfactant to yield a latex of relatively uniform particle size, e.g., 0.04 to 1 micron average diameter.

The monoacrylate component of the monomer mixture comprises about 80 to about 98 mole percent of the mixture while the balance, the di- or tri-functional component, constitutes about 2 to about 20 mole percent. The monoacrylate component contains about 65 to about 98, preferably about 70 to about 95, mole percent of a monofunctional, alkyl monoacrylate and about 2 to about 35, preferably about 5 to about 30 mole percent of a hydroxyalkyl acrylate. The monofunctional, alkyl acrylate is preferably an ester of a $C_2$–$C_8$ monohydric alcohol and acrylic acid, e.g., ethyl acrylate, butyl acrylate, hexyl acrylate, 2-ethylhexyl acrylate and/or mixtures of the same. Certain alkyl acrylates may be used when a crosslinked polymer thereof has an appropriate glass transition temperature, e.g., dodecyl acrylate. Butyl acrylate and 2-ethyl hexyl acrylate are the most preferred of the monofunctional, monoacryltes for use in forming this rubber. The hydroxyalkyl acrylate is preferably the ester of either acrylic or methacrylic acid and a $C_2$–$C_3$ diol, e.g., hydroxyethyl acrylate, hydroxyethyl methacrylate, hydroxypropyl acrylate, hydroxypropyl methacrylate, or mixtures of the same. The glass transition temperature of the crosslinked polymer should be such that the particle retains its rubber-like properties at temperatures to which the paint would normally be exposed.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably a $C_2$–$C_6$, dihydric alcohol. In another embodiment, the crosslinking agent is a triester of acrylic or methacrylic acid and a $C_2$–$C_8$, preferably a $C_2$–$C_6$, trihydric alcohol.

The polymerization process is continued to yield a stable latex of relative uniform particle size and composition. The latex is coagulated, washed, and dried to yield a finely divided powder suitable for use in this invention.

The monomer charge is emulsified by one or more micelle-forming compounds composed of a hydrophobic part, such as a hydrocarbon group containing 8 or more carbon atoms, and a hydrophylic part, such as alkali metal or ammonium hydroxide groups, phosphate or sulfate partial ester groups, sulfonate groups, and the like. Exemplary emulsifying agents include alkali metal sulfonates of styrene, naphthlene, decyl benzene and dodecyl benzene; sodium dodecyl sulfates; sodium stearate; sodium oleate; the sodium alkyl aryl sulfonates; polyoxymethylene sulfates and phosphates; the ethylene oxide condensates with long chain fatty acids, alcohols and mercaptans and the alkali metal salts of rosins acids. These materials and the techniques of their employment in emulsion formation and maintenance are well known to the art and have no unusual application here. As they are conventional material employed in a conventional manner, further description and explanation is unnecessary.

A polymerization initiator is composed of one or more water-soluble, free-radical-generating species such as hydrogen peroxide or sodium, potassium, or ammonium persulfates, perborates, peracetates, percarbonates, and the like.

As is well known in the art, these initiators may be associated with activating systems such as redox systems which may incorporate mild reducing agents such as sulfites and thiol sulfites and redox reaction promoters such as transition metal ions.

A chain transfer agent or a mixture of chain transfer agents may be added to the reaction medium to limit the molecular weight of the crosslinking acrylic polymers. Such chain transfer agents are generally mercaptans such as dodecane thiol, benzene thiol, pentene thiol, and butane thiol.

Those skilled in the art will be aware that other emulsifying agents, polymerization initiators and chain transfer agents may be used when compatible with the polymerization system herein employed. The reaction may be carried out at temperatures from about 40° C. to about 80° C., or at lower temperatures, as from 0° C. to about 80° C., in the case of activated systems.

Another method of preparation, hereinafter illustrated the rubber particles are formed in an aliphatic hydrocarbon medium.

(III) THE DIISOCYANATE REACTANT

The preferred diisocyanate for use in this invention is toluene diisocyanate and this may be either the 2,4- or 2,6-isomer or a mixture thereof. This diisocyanate may be used without blocking or one of the isocyanate groups thereof may be blocked with caprolactam or other suitable blocking agents before use. One may also use other diisocyanates so long as one of the isocyanate groups is blocked with caprolactam or other suitable blocking agents. Representative of other diisocyanate which can be monoblocked are the following: 4,4'-diphenylmethane diisocyanate, 1-phenoxy-2,4-phenylene diisocyanate, 1-tert-butyl-2,4-phenylene diisocyanate, and 1-ethyl-2,4-phenylene disocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate group at a temperature range of about 120° to about 170° C. Sometimes a catalyst such as triethylene diamine or stannous octoate may be advantageously used and 0.05 to 1 percent concentration (basis weight of reactants) to assist the deblocking process. A diisocyanate can be monoblocked with caprolactam by reacting the diisocyanate with caprolactam and toluene. When the first isocyanate group is blocked, the monolocked product precipitates out of solution. See Raymond R. Myers and J. S. Long, Film-Forming Compositions, vol. 1, part I, page 485, published by Marcel Dekker Inc., New York, N.Y., U.S.A. (1961).

The reason for using the monoblocked diisocyanates is to assure that only one of the isocyanate groups per diisocyanate molecule will react with the hydroxy-functionality of the rubber particle. The second isocyanate group of the molecule is thus left to react with the hydroxyalkyl acrylate thereby providing the addition product with alpha-beta olefinic unsaturation. When an excess of diisocyanate is employed and not removed prior to introduction of the hydroxyalkyl acrylate there will be formed a corresponding amount of the addition product of 1 mole of diisocyanate and 2 moles of hydroxyalkyl acrylate. This provides no problem since this material is copolymerizable with the other paint binder components, increases the concentration of urethane linkages in the resultant paint film, and serves as a viscosity modifier.

(IV) THE HYDROXYALKYL ACRYLATE

A hydroxyalkyl acrylate is reacted with the second diisocyanate group in the next step of the process. This component is preferably employed in slight excess of the amount required to react with the remaining isocyanate group. The preferred hydroxyalkyl acrylate are hydroxyethyl acrylate, hydroxyethyl methacrylate, hydroxypropyl acrylate, hydroxypropyl methacrylate, and mixtures of the same.

(V) VINYL MONOMERS EMPLOYED IN THE PAINT DISPERSION

The pain binder dispersion advantageously contain about 20 to about 80, preferably about 25 to about 75, weight percent vinyl monomers and about 20 to about 80, preferably about 25 to about 75 weight percent of the polymeric component. This polymeric component consists essentially of the rubber-urethane-acrylate addition product hereinbefore described and the alpha-beta olefinic unsaturated, vinyl resin hereinbefore described. The relative concentration of these two constituents of the polymeric component may vary widely, e.g., the polymeric component may comprise about 2 to about 98, preferably 5 to 95, weight percent of the alpha-beta olefinically unsaturated vinyl resin and about 98 to about 2, preferably 95 to 5 weight percent of the rubber-urethane-acrylate addition product.

Monomer type and concentration provide one means for adjusting the viscosity of the paint dispersion to conform to the method of application desired, e.g., spray coating, roll coating, etc. In functional terms the amount of vinyl present is at least sufficient to convert the alpha-beta olefinically unsaturated rubber-urethane-acrylate addition product and the alpha-beta olefinically unsaturated, vinyl resin into a crosslinked continuous coating on the surface of a substrate when a film of such coating dispersion is applied thereto and exposed to ionizing radiation, e.g., an electron beam. Vinyl monomers employed may be monofunctional monoacrylates, especially the esters of acrylic acid or methacrylic acid and a $C_1$–$C_8$, preferably a $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent, of diacrylate, e.g., the diesters of acrylic or methacrylic acid and a $C_2$–$C_6$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g. styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) PREPARATION AND APPLICATION OF THE COATING DISPERSION TO A SUBSTRATE

By adjusting the viscosity of the coating dispersion to a viscosity compatible with the desired method of coating these coatings may be applied by any of the conventional methods, e.g., brushing, spraying, roll coating, curtain coating, flow coating, etc.

The viscosity of the paint binder solution can be adjusted by varying the molecular weight of the rubber-urethane-acrylate addition product. This may be accomplished by controlling the average number of functional groups per molecule through control of the concentration of the hydroxyalkyl acrylate constituent in the monomer mixture introduced into the reaction medium when the rubber particle is produced. The viscosity may also be regulated by varying the relative concentration of the polymeric component with respect to the vinyl monomer component and/or by varying the relative concentration of dissimilar monomers within the vinyl monomer component. The paint binder dispersion may be applied to the substrate essentially free of non-polymerizable, organic solvent and/or diluents or it may be applied with the solvent and/or diluents in a method of application wherein the solvents and/or diluents are flashed off prior to polymerization. Coatings may be applied to any substrate, e.g., metal, wood, glass, shaped polymeric solids, etc. These coatings will ordinarily be applied to an average depth in the range of about 0.1 to about 4 mils more commonly about 0.5 to about 2 mils.

(VII) CURING THE COATINGS

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dosage rates of about 0.1 to about 100 mrad per second on a workpiece, preferably a moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, preferably radiation with minimum energy of, or equivalent to, at least about 5,000 electron volts except when the curing is carried out in vacuum. The preferred method of curing films of the instant paint binders on the substrates to which they have been applied is by subjecting such films to a beam of polymerization-effecting electrons which at its source of emission is within the range of, or equivalent to, about 100,000 to about 500,000 electron volts. If radiation is carried out in vacuum or at a reduced pressure, this energy range may be considerably lower. In this method of curing it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free inert gas such as hydrogen or helium.

In this application, the term "paint" is meant to include finely ground pigment and/or filler in the binder, the binder without pigment and/or filler or having very little of the same which can be tinted if desired. Thus, the binder which is ultimately converted to a durable film resistant to wear, weather, etc., can be all or virtually all that is used to form the film, or it can be a vehicle for pigmentary and/or mineral filler material.

The abbreviation "mrad" as employed herein means 1 million rad. The term "rad" as employed herein means that dose of radiation which results in the absorption of 100 ergs of energy per gram of absorber, i.e., coating film.

The electron emitting means may be a linear electron accelerator capable of producing a direct current potential in the range hereinbefore mentioned. In such device, electrons are ordinarily emitted from a hot filament and accelerated through a uniform voltage gradient. The electron beam which may be about ⅛ inch in diameter at this point, is then scanned in one direction to make a fan-shaped beam and then passed through a metal window, e.g., aluminum, aluminum-copper alloy, or a magnesium-thorium alloy of about 0.003 inch thickness. This invention will be more fully understood from the following examples:

(I) Rubber particles are prepared in aqueous medium using the following procedures: To 1,000 parts by weight water which has been boiled and cooled to room temperature under nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of this monomer mixture is begun at a rate such that the temperature of the reaction mixture is maintained at 47° to 50° C. During the addition of the last ⅔ of the monomer mixture, 5.72 parts by weight sodium dodecyl sulfate dissolved in 35.7 parts by weight water are added at a substantially constant rate. During the addition of the last one-third of the monomer mixture there are added 65 parts by weight hydroxyethyl acrylate. The reaction mixture is maintained at 47° to 50° C. for about 2 hours.

The emulsion is then coagulated by addition of about 20 grams of concentrated hydrochloric acid solution and 100 ml. of water. The rubber particles are isolated by filtration and washed with methanol containing 1 weight percent of hydrochloric acid. The particles are then dried.

(II) Determination of the concentration of reactive hydroxyl groups on the surfaces of the particles is made by the well known method of analysis wherein the hydroxyl groups are reacted with acetic anhydride using a pyridine catalyst. The acetic acid is back titrated with sodium hydroxide. For details, reference is made to C. A. Steyermark, Quantitative Organic Analysis, pp. 302–303, published by Blakiston Co., New York, Toronto, and Philadelphia (1951).

(III) The hydroxy-functional rubber particles prepared in I above are reacted with a diisocyanate using the following procedures: The hydroxy-functional particles in the quantity providing 1 mole of reactive hydroxyl groups on the collective surfaces thereof are suspended in toluene and 2,4-toluene diisocyanate, in the quantity necessary to provide about 3 isocyanate groups per each hydroxyl group, is incrementally added at a rate slow enough to keep the temperature of the reaction mix below 32° C. After the initial exotherm subsides, the reaction mixture is stirred for 1 hour.

(IV) The rubber diisocyanate adduct is mixed with a hydroxyalkyl acrylate using the following procedure: The temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. The rubber-urethane-acrylate addition product, hereinafter referred to as resin, is ready for employment in coating composition.

(V) Paint dispersions are prepared from the rubber-urethane-acrylate resin, vinyl monomers and an alpha-beta olefinically unsaturated, vinyl resins prepared by the following procedure:

| Starting materials | Mols | Grams |
| --- | --- | --- |
| (a) Methyl methacrylate | 2.6 | 260.0 |
| (b) Ethyl acrylate | 5.0 | 500.0 |
| (c) Glycidyl methacrylate | 1.7 | 240.0 |
| (d) Methacrylic acid | 1.7 | 146.5 |
| (e) Xylene | 1,000 ml. | |
| (f) Benzoyl peroxide | | 10.0 |
| (g) Hydroquinone | | 0.2 |

Procedure

The xylene is heated to 130° C. under a nitrogen blanket and stirred continuously. The monomers (a), (b) and (c) and the reaction initiator (f) are added to the xylene. The monomers (a), (b), and (c) are added separately and incrementally over a period of 3 hours. The charge is heated at 130°–133° C. for about 3 hours. The charge is cooled to about 50° C. The hydroquinone (g) is added to the charge. The methacrylic acid (d) is added to the charge and the temperature is raised to 138° C. gradually over a period of about 1.5 hours. This temperature is maintained for about 1 hour and the xylene is removed under vacuum.

A first paint dispersion is prepared using 50 parts by weight of this copolymer of vinyl monomers, 25 parts by weight of the rubber-urethane-acrylate resin and about 25 parts by weight methyl methacrylate. A second paint dispersion is prepared using about 25 parts by weight of this copolymer of vinyl monomers, about 50 parts by weight of the rubber-urethane-acrylate resin, and about 35 parts by weight methyl methacrylate. A third paint dispersion is prepared using about 30 parts by weight of this copolymer of vinyl monomers, about 10 parts by weight of the rubber-urethane-acrylate resin and about 60 parts by weight methyl methacrylate. A fourth paint dispersion is prepared by using about 40 parts by weight of this copolymer of vinyl monomers, about 5 parts by weight of the rubber-urethane-acrylate resin, and about 55 parts by weight of methyl methacrylate.

(VI) Coating of substrates: The dispersion prepared in V above are separately coated on substrate of steel, wood, glass, and polymeric solid, i.e., acrylonitrile-butadiene-styrene copolymer, to an average depth of about 7/10 mil (0.0007 inch) and irradiated with an electron beam. The conditions of irradiation are as follows:

Potential _____ kv __ 275
Current _____ milliamperes __ 30
Distance, emitter from workpiece _____ inches __ 10
Dose _____ mrad __ 10
Atmosphere _____ Nitrogen

EXAMPLE 2

The procedure of Example 1 is repeated with the differences that an equimolar amount of ethyl acrylate is substituted for the butyl acrylate used in the monomer mixture to form the rubber particle and ½ of the methyl methacrylate used to form the coating dispersions with the rubber-urethane-acrylate resin and the vinyl resin is replaced with an equimolar amount of styrene.

EXAMPLE 3

The procedure of Example 1 is repeated with the differences that an equimolar amount of 2-ethyl hexyl acrylate is substituted for the butyl acrylate used in the monomer mixture to form the rubber particle, and the vinyl monomer component used to form the coating solution with the rubber-urethane-acrylate addition product (resin) and the vinyl resin is a mixture of 30 mole percent methyl methacrylate, 20 mole percent butyl methacrylate, 10 mole percent 2-ethyl hexyl acrylate, 20 mole percent styrene and 20 mole percent vinyl toluene.

EXAMPLE 4

The procedure of Example 1 is repeated with the differences that an equimolar amount of cyclohexyl acrylate is substituted for the butyl acrylate and equimolar amounts of 1,3-butylene diacrylate is substituted for the 1,3-butylene dimethacrylate used to form the rubber particle and the vinyl monomer component used to form the paint dispersion with the rubber-urethane-acrylate addition product and the vinyl resin is a mixture of 70 mole percent methyl methacrylate, 20 mole percent alpha methyl styrene and 10 mole percent 1,3-butylene dimethacrylate.

EXAMPLE 5

The procedure of Example 1 is repeated with the differences that an equimolar amount of 1,6-hexamethylene diacrylate is substituted for the 1,3-butylene dimethacrylate used to form the rubber particle.

EXAMPLE 6

The procedure of Example 1 is repeated with the differences that an equimolar amount of divinyl benzene is substituted for the 1,3-butylene dimethacrylate used in the monomer mixture to form the rubber particle and the vinyl monomer component used to form the coating dispersion with the rubber-urethane-acrylate addition product and the vinyl resin is a mixture of 60 mole percent methyl methacrylate, 20 mole percent styrene, 10 mole percent butyl acrylate, and 10 mole percent divinyl benzene.

EXAMPLE 7

The procedure of Example 1 is repeated with the difference that a single paint dispersion is prepared using 60 weight percent of the methyl methacrylate and 40 weight percent of a polymeric component of which 50 weight percent is the rubber-urethane-acrylate addition product and 50 weight percent is the copolymer of vinyl monomers.

EXAMPLE 8

The procedure of Example 1 is repeated with the difference that a single paint dispersion is prepared using 40 weight percent of the methyl methacrylate and 60 weight percent of the polymeric component which is made up of 50 weight percent of the rubber-urethane-acrylate addition product and 50 weight percent of the copolymer of vinyl monomers, i.e., vinyl resin.

EXAMPLE 9

The procedure of Example 1 is repeated except for the differences that the monoacrylate component of the monomer mixture used to form the rubber particles consists of about 5 mole percent hydroxyethyl methacrylate and about 95 mole percent butyl acrylate. The monomers are divided into about 5 equal fractions for addition to the reaction mixture and the hydroxyethyl methacrylate is added in the fifth or last fraction.

EXAMPLE 10

The procedure of Example 1 is repeated except for the differences that the monoacrylate component of the monomer mixture used to form the rubber particles consists of about 15 mole percent hydroxyethyl acrylate and about 85 mole percent butyl acrylate and the diacrylate is 1,3-butylene diacrylate. The monomer mixtures are divided into about 5 equal fractions and the hydroxyethyl acrylate is added in the fifth and last fraction.

EXAMPLE 11

The procedure of Example 1 is repeated with the differences that the curing is carried out in a helium atmosphere and the potential of the electron beam upon exiting from the electron window into such atmosphere is about 260 kv.

EXAMPLE 12

The procedure of Example 1 is repeated with the differences that the curing is carried out in a nitrogen atmosphere containing a minor amount of $CO_2$ and the potential of the electron beam upon exiting from the electron window into such atmosphere is about 295 kv.

EXAMPLE 13

Substrates are coated in accordance with this invention using the following procedure:

(I) Rubber particles are prepared in an organic medium using the procedures set forth below:

(A) A mixture is formed from the following:

| Materials: | Grams |
|---|---|
| Ethyl acrylate | 60.0 |
| Hydroxyethyl methacrylate | 20.0 |
| 1,3-butylene dimethacrylate | 20.0 |
| Dispersion agent[1] | 3.0 |
| AIBN[2] | 0.5 |

[1] Amphipathic copolymer (one portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg.-KOH/g. The product is then reacted with methacrylic anhydride (170 g.). The resulting material is then copolymerized with an equimolar amount of methyl methacrylate using AIBN initiator (9 g.) and butyl acetate solvent. This method of producing this dispersing agent is described in detail by K. E. J. Barratt and H. R. Thomas in Journal of Polymer Science, Part A–1, vol. 7, 2625 (1969). Other dispersing agents which are effective for stabilizing suspensions in hydrocarbon liquids may be used in place of the above described materials.

[2] 2,2′ azobis-(2-methylpropionitrile).

(B) The mixture of the above listed materials is added to 1,000 grams n-dodecane under nitrogen. The reaction mixture is warmed to 40° C. When the exotherm starts the temperature is allowed to rise to 80° C. The temperature is maintained at 80° C. for 30 minutes.

(II) The hydroxy-functional rubber particles in I above is reacted with a diisocyanate using the following procedure: The temperature of the reaction mixture is allowed to cool to 30° C. and there is slowly added 132 grams of 2,4-toluene diisocyanate. The temperature is maintained in the range of 30°–35° C. for 2 hours.

(III) There is added to the reaction mix 125 grams of hydroxyethyl methacrylate. The reaction mix is then heated at 45° C. for 4 hours. The rubber-urethane-acrylate addition product particles are separated from the solvent by filtration.

(IV) A paint dispersion is prepared using 40 parts by weight of methyl methacrylate and 60 parts by weight of a polymeric component consisting of 58 parts by weight of an alpha-beta olefinically unsaturated vinyl resin[1] and 2 parts by weight of the rubber-urethane-acrylate addition product.

Procedure

The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, and nitrogen is bubbled through the solution during heatup and throughout the reaction. The combined monomers and initiators (azobisiso butyronitrile) is added to the refluxing solution over a 2 hour period. The initiator weight is 10 parts by weight per 1,000 parts by weight vinyl monomers. The reaction solution is refluxed until the conversion of monomers to polymer is greater than 97 percent (8–16 hours). In the second step hydroquinone is added as an inhibitor and then the methacrylic acid is added to react with the residual epoxy groups on the polymer. Triethylamine is used as a catalyst. This esterification reaction is carried out at reflux temperatures until 80 percent esterification is accomplished (determined by residual acid member). The xylene is then removed by vacuum distillation.

(V) Coating of substrates: The paint dispersion prepared in IV is sprayed upon substrates of steel, aluminum, glass, paper, wood, and polymeric solid, i.e., polypropylene, to an average depth of about 1.5 mils and cured thereon by placing said substrate into a nitrogen atmosphere and exposing the coated surfaces to an electron beam (potential 275 kv.—current 30 milliamperes) until the coatings on the surfaces of the substrates are tack-free to the touch.

EXAMPLE 14

The procedure of Example 13 is repeated with the differences that an equimolar amount of 1-tert-butyl-2,4-phenylene diisocyanate with 1 isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 15

The procedure of Example 13 is repeated with the differences that an equimolar amount of 1-ethyl-2,4-phenylene diisocyanate is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 16

The procedure of Example 13 is repeated with the differences that an equimolar amount of 4,4′-diphenylmethane diisocyanate with 1 isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-phenoxy-2,4-phenylene diisocyanate with 1 isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedure of Example 13 is repeated except that an equivalent amount of acrylic acid is substituted for the methacrylic acid used to prepare the vinyl resin.

[1] This vinyl resin is prepared from the following materials using the following procedure:

| Materials | Parts by wt. |
|---|---|
| (a) Xylene | 600.0 |
| (b) Methyl methacrylate | 196.0 |
| (c) Ethyl acrylate | 333.0 |
| (d) Glycidyl methacrylate | 71.0 |
| (e) Azobisiso butyronitrile | 6.0 |
| (f) Hydroquinone | 0.12 |
| (g) Methacrylic acid | 42.0 |
| (h) Triethylamine | 0.96 |

EXAMPLE 19

The procedure of Example 13 is repeated except that the methacrylic acid component is substituted for the glycidyl methacrylate component in the first step of the procedure and the glycidyl methacrylate is substituted for the methacrylic acid component in the second step of the procedure.

EXAMPLE 20

The procedures of Examples 1 and 13 are repeated with the differences that the alpha-beta olefinically unsaturated vinyl resin is prepared from the following materials using the following procedures:

| Materials: | Parts by wt. |
|---|---|
| (a) Ethyl acrylate | 38.8 |
| (b) Methyl methacrylate | 23.2 |
| (c) Allyl glycidyl ether | 37.0 |
| (d) Benzoyl peroxide | 1.0 |
| Xylene | Solvent |

Procedure (I) To a reaction vessel provided with a condenser, thermometer, agitator and dropping funnel there are charged an amount of xylene equal in weight to the reactants to be added in the first reaction step. The xylene is heated to about 100°–120° C. The reactants and the catalyst are thoroughly mixed and added slowly with a dropping funnel to the heated xylene over a period of 4 hours. The reaction is held at this temperature for 1–2 hours after addition is complete and then allowed to cool to room temperature.

(II)

| Materials: | Parts by wt. |
|---|---|
| Copolymers from Step I | 69.4 |
| Allyl alcohol | 30.4 |
| Potassium hydroxide | 0.2 |

A solution of the allyl alcohol and the potassium hydroxide is added to the copolymer at room temperature. The mixture is then heated to a temperature of about 100°–120° C. This temperature is maintained for about 7 hours and allowed to cool. The vinyl monomer reaction mixture is heated to about 60° C. and the xylene and excess reactants are removed by vacuum distillation. About 0.07 part by weight hydroquinone and the amount of vinyl monomers to be used in the paint dispersion are added to the copolymers at this time.

EXAMPLE 21

The procedure of Example 13 is repeated except that the vinyl resin is prepared from the following ingredients in the manner hereinafter set forth:

| Starting materials: | Parts by wt. |
|---|---|
| (a) Ethyl acrylate | 39 |
| (b) Methyl methacrylate | 24 |
| (c) Allyl alcohol | 36 |
| (d) Benzoyl peroxide | 1 |

Procedure (I) To a reaction vessel provided with a condenser, thermometer, agitator, and dropping funnel there is added an amount of xylene equal in weight to the reactants to be added in the first reaction step. The xylene is heated to about 100°–120° C. The reactants and the catalysts are thoroughly mixed and added slowly with a dropping funnel to the heated xylene over a period of 4 hours. The reaction is held at this temperature for 1 to 2 hours after addition is complete and then allowed to cool to room temperature.

(II)

| Materials: | Parts by wt. |
|---|---|
| Copolymers from Step I | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of 100°–120° C. This temperature is maintained for about 7 hours and allowed to cool. The vinyl polymer reaction mixture is heated to about 60° C. and the xylene and excess reactance are removed by vacuum distillation. The monomers to be used in the paint dispersion and about 0.07 part by weight of hydroquinone are added to the vinyl resin.

EXAMPLE 22

The procedure of Example 13 is repeated except that the vinyl resin is prepared from the following materials in the manner hereinafter set forth:

Step I.

| Starting materials: | Parts by wt. |
|---|---|
| (a) Methyl methacrylate | 400 |
| (b) Ethyl acrylate | 400 |
| (c) Hydroxyethyl methacrylate | 195 |
| (d) Toluene | 1000 |
| (e) Benzoyl peroxide | 30 |

The benzoyl peroxide is dissolved in a solution of the methyl methacrylate, ethyl acrylate, hydroxyethyl methacrylate and one-half of the toluene. This solution is added incrementally to the remainder of the toluene and refluxed over a 7 hour period with a final pot temperature of about 138°–140° C. Reflux is maintained for another 3 hours and the solution cooled.

Step II.

| Starting materials: | Parts by wt. |
|---|---|
| Solution of Step I | 500 |
| Acrylyl chloride | 33.8 |
| Toluene | 30 |

The solution from Step I is heated to 60° C. and the solution of the acrylyl chloride and toluene are added dropwise over a 4 hour period while the temperature is allowed to rise to about 90° C. After heating for another 2.5 hours, this solution is subjected to vacuum below 10 mm. Hg at 70° C. and the acrylic polymer is recovered.

EXAMPLE 23

The procedure of Example 13 is repeated except that the vinyl resin is prepared from the following materials in the manner hereinafter set forth: One hundred (100) parts by weight of a styrene allyl alcohol copolymer containing about 21.4 weight percent allyl alcohol and having an average molecular weight of about 1,620 and 0.1 part by weight hydroquinone are dissolved in toluene and heated to 90° C. To this solution, 41.8 parts by weight of methacrylyl chloride and toluene are added dropwise over a 1 hour period. Heating is continued and the temperature is allowed to rise to toluene reflux until essentially a complete cessation of gas liberation is obtained. After an additional 5 hours, the solvent is removed by vacuum.

EXAMPLE 24

The procedure of Example 13 is repeated except that the depth of coating is varied in separate tests using films of 0.2, 0.5, 1.0, 2.0 and 3.5 mils. Irradiation is continued until tack-free films are achieved.

EXAMPLE 25

The procedure of Example 1 is repeated with the difference that the paint dispersion consists of 40 parts by weight of an equimolar mixture of methyl methacrylate and styrene and 60 parts by weight of a polymeric component consisting of 55 parts by weight of the alpha-beta olefinically unsaturated vinyl resin and about 5 parts by weight of the rubber-urethane-acrylate addition product.

EXAMPLE 26

The procedure of Example 13 is repeated with the difference that the paint dispersion consists of 40 parts by weight styrene and 60 parts by weight of a polymeric component consisting of 50 parts by weight of the alpha-beta olefinically unsaturated vinyl resin and about 10 parts by weight of the rubber-urethane-acrylate addition product.

EXAMPLE 27

The procedure of Example 1 is repeated with the difference that the paint dispersion consists of 40 parts by weight methyl methacrylate and styrene in an equimolar mixture and 60 parts by weight of a polymeric component consisting of 5 parts by weight of the alpha-beta olefinically unsaturated vinyl resin and 55 parts by weight of the rubber-urethane-acrylate addition product.

EXAMPLE 28

The procedure of Example 13 is repeated with the difference that the paint dispersion consists of 60 parts by weight of a vinyl monomer mixture made up of 30 mole percent methyl methacrylate, 20 mole percent ethyl acrylate, 10 mole percent butyl acrylate, 10 mole percent butyl methacrylate, 15 mole percent 2-ethyl hexyl acrylate and 15 mole percent styrene and 40 parts by weight of a polymeric component consisting of about 10 parts by weight of the olefinically unsaturated vinyl resin and about 50 parts by weight of the rubber-urethane-acrylate addition product.

EXAMPLE 29

The procedures of Examples 1 and 13 are repeated except for the difference that a functionally equivalent amount of 1,1,1-trimethylolethane triacrylate is substituted for the 1,3-butylene dimethacrylate in the formation of the hydroxy-functional rubber particle.

EXAMPLE 30

The procedures of Examples 1 and 13 are repeated except for the difference that a functionally equivalent amount of 1,1,1-trimethylolpropane trimethacrylate is substituted for the 1,3-butylene dimethacrylate in the formation of the hydroxy-functional rubber particle.

EXAMPLE 31

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional rubber particle.

The terms "acrylate" and "acrylates," when used herein without a modifier distinguishing between esters of acrylic acid and methacrylic acid shall be understood to include both. This, of course, does not apply to a naming of a specific compound.

It will be understood by those skilled in the art that modifications can be made within the foregoing examples within the scope of the invention as hereinbefore described and hereinafter claimed:

We claim:

1. A radiation-curable paint which on a pigment and mineral filler-free basis comprises a film-forming dispersion of about 20 to about 80 weight percent of a polymeric component consisting essentially of (A) about 2 to about 98 weight percent of an alpha-beta olefinically unsaturated vinyl resin having average molecular weight in excess of about 1,000, containing about 0.5 to about 5 units of alpha-beta olefinic unsaturation per 1,000 units molecular weight, and being further characterized in that its longest carbon-to-carbon chain is a copolymer wherein above 50 mole percent of the constituent monomers are selected from the group consisting of acrylic monomers and aromatic vinyl hydrocarbon monomers, the alpha-beta olefinic unsaturation thereof is situated within a lesser carbon to carbon chain that is pendant from said longest carbon to carbon chain and separated therefrom by a linking group selected from the group consisting of ester groups and ether groups, and (B) about 98 to about 2 weight percent of a rubber-urethane-acrylate addition product formed by reacting a first isocyanate group of a diisocyanate with a hydroxy-functional particle elastomeric particle of crosslinked acrylic polymer and reacting the remaining isocyanate group of said diisocyanate with a hydroxyalkyl acrylate, said particle of crosslinked acrylic polymer consisting essentially of (1) a minor and crosslinking amount of a di- or tri-functional monomer containing 2 or more non-conjugated terminal ethylenic groups, said minor and crosslinking amount not exceeding about 20 mole percent of the constituent monomers of the crosslinked acrylic polymer, and (2) a remainder consisting essentially of a monoacrylate component which consists essentially of about 65 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, said remainder constituting at a minimum about 80 mole percent of the constituent monomers of the crosslinked acrylic polymer.

2. A radiation-curable paint in accordance with claim 1 wherein said particle of crosslinked acrylic rubber has average diameter in the range of about 0.04 to 1 micron.

3. A radiation-curable paint in accordance with claim 1 wherein said monoester of acrylic acid is butyl acrylate and said di- or tri-functional monomer is selected from the group consisting of 1,3-butylene diacrylate and 1,3-butylene dimethacrylate.

4. A radiation-curable paint in accordance with claim 1 wherein said monoester of acrylic acid is 2-ethyl hexyl acrylate and said di- or tri-functional monomer is selected from the group consisting of 1,3-butylene diacrylate and 1,3-butylene dimethacrylate.

5. A radiation-curable paint in accordance with claim 1 wherein said diisocyanate is toluene diisocyanate.

6. A radiation-curable paint in accordance with claim 1 wherein said hydroxyalkyl acrylate is selected from the group consisting of hydroxyethyl acrylate, hydroxyethyl methacrylate, hydroxypropyl acrylate and hydroxypropyl methacrylate.

7. A radiation-curable paint in accordance with claim 1 wherein said alpha-beta olefinically unsaturated vinyl resin has between about 0.7 and about 3.5 units of alpha-beta olefinic unsaturation per 1,000 units molecular weight.

8. A radiation-curable paint in accordance with claim 1 wherein said alpha-beta olefinically unsaturated vinyl resin has average molecular weight between 1,000 and about 25,000 and between about 0.7 and about 3.5 units of alpha-beta olefinic unsaturation per 1,000 units molecular weight.

9. A radiation-curable paint in accordance with claim 1 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from the group consisting of divinyl benzene and diesters of acrylic or methacrylic acid and a $C_2$–$C_6$ dihydric alcohol, said vinyl resin has between about 0.7 and about 3.5 units of alpha-beta olefinic unsaturatoin per 1,000 units molecular weight, and said particle of graded rubber used to form said rubber-urethane-acrylate addition product has average diameter in the range of about 0.04 to about 1 micron.

10. A radiation-curable paint which on a pigment and mineral filler-free basis comprises a film-forming dispersion of about 20 to about 80 weight percent vinyl monomers of which 40 to 100 mole percent consist essentially of vinyl monomers selected from the group consisting of esters of acrylic or methacrylic acid and a $C_1$–$C_8$ monohydric alcohol, $C_8$–$C_9$ monovinyl hydrocarbons, 0 to 30 mole percent consist essentially of a difunctional compound selected from the group consisting of divinyl benzene and diesters of acrylic or methacrylic acid and a $C_2$–$C_6$ dihydric alcohol, and 0 to 30 mole percent consist essentially of monovinyl monomers selected from the group consisting of acrylonitrile, methacrylonitrile, and vinyl acetate and about 80 to about 20 weight percent of a polymeric component consisting essentially of (A) about 5 to about 95 weight percent of an alpha-beta olefinically unsaturated vinyl resin having average molecular weight in the range of 1,000 to about 15,000, containing about 0.7 to about 3.5 units of alpha-beta olefinic unsaturation per 1,000 units molecular weight, and being further characterized in that its longest carbon-to-carbon chain is a copolymer wherein at least above 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 95 to 5 weight percent of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxy alkyl acrylate selected from the group consisting of hydroxyethyl acrylate, hydroxyethyl methacrylate, hydroxypropyl acrylate, and hydroxypropyl methacrylate, said particle of crosslinked acrylic polymer consisting essentially of (1) a minor and crosslinking amount of a di- or tri-functional monomers selected from the group consisting of divinyl benzene, a diester of acrylic or methacrylic acid and a $C_2$–$C_6$ dihydric alcohol or a triester of acrylic or methacrylic acid and a $C_2$–$C_6$ trihydric alcohol, said minor and crosslinking amount not exceeding about 20 mole percent of the constitutent monomers of the crosslinked acrylic polymer, and (2) a remainder consisting essentially of monoacrylate component which consists of essentially of about 65 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, said remainder constituting at a minimum about 80 mole percent of the constituent monomers of the crosslinked acrylic polymer.

11. A radiation-curable paint in accordance with claim 10 wherein said minor and crosslinking amount constitutes between about 2 and about 20 mole percent of the constituent monomers of said crosslinked acrylic polymer and said remainder constitutes between about 80 and about 98 mole percent of the constituent monomers of said crosslinked acrylic polymer.

12. A radiation-curable paint in accordance with claim 10 wherein said vinyl resin has average molecular weight in the range of about 5,000 to about 15,000.

13. A radiation-curable paint in accordance with claim 10 wherein said minor and crosslinking amount consists essentially of 1,3-butylene diacrylate or 1,3-butylene dimethyacrylate and said monesters of acrylic acid and a $C_2$–$C_8$ monohydric alcohol in said remainder is butyl acrylate or 2-ethyl hexyl acrylate.

14. The method of coating a substrate which comprises:

(I) applying to a surface of said substrate a film of radiation-curable paint which on a pigment and mineral filler-free basis comprises a film-forming dispersion of about 20 to about 80 weight percent of a polymeric component consisting essentially of (A) about 2 to about 98 weight percent of an alpha-beta olefinically unsaturated vinyl resin having average molecular weight in excess of about 1,000, containing about 0.5 to about 5 units of alpha-beta olefinic unsaturation per 1,000 units molecular weight, and being further characterized in that its longest carbon-to-carbon chain is a copolymer wherein above 50 mole percent of the constituent monomers are selected from the group consisting of acrylic monomers and aromatic vinyl hydrocarbon monomers the alpha-beta olefinic unsaturation thereof is situated within a lesser carbon to carbon chain that is pendant from said longest carbon to carbon chain and separated therefrom by a linking group selected from the group consisting of ester groups and ether groups, and (B) about 98 to about 2 weight percent of a rubber-urethane-acrylate addition product formed by reacting a first isocyanate group of a diisocyanate with a hydroxy-functional particle elastomeric particle of crosslinked acrylic polymer and reacting the remaining isocyanate group of said diisocyanate with a hydroxyalkyl acrylate, said particle of crosslinked acrylic polymer consisting essentially of (1) a minor and crosslinking amount of a di- or tri-functional monomer containing 2 or more nonconjugated terminal ethylenic groups, said minor and crosslinking amount not exceeding about 20 mole percent of the constituent monomers of the crosslinked acrylic polymer, and (2) a remainder consisting essentially of a monoacrylate component which consists essentially of about 65 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, said remainder constituting at a minimum about 80 mole percent of the constituent monomers of the crosslinked acrylic polymer, and (II) crosslinking said film upon said substrate by exposing said substrate to a beam of electrons having average energy in the range of about 100,000 to about 500,000 electron volts.

15. The method of coating a substrate which comprises:

(I) applying to a surface of said substrate a film of radiation-curable paint which on a pigment and mineral filler-free basis comprises a film-forming dispersion of about 20 to about 80 weight percent vinyl monomers of which 40 to 100 mole percent consist essentially of vinyl monomers selected from the group consisting of esters of acrylic or methacrylic acid and a $C_1$–$C_8$ monohydric alcohol, $C_8$–$C_9$ monovinyl hydrocarbons, 0 to 30 mole percent consist essentially of a difunctional compound selected from the group consisting of divinyl benzene and diesters of acrylic or methacrylic acid and a $C_2$–$C_6$ dihydric alcohol, and 0 to 30 mole percent consist essentially of monovinyl monomers selected from the group consisting of acrylonitrile, methacrylonitrile, and vinyl acetate and about 80 to about 20 weight percent of a polymeric component consisting essentially of (A) about 5 to about 95 weight percent of an alpha-beta olefinically unsaturated vinyl resin having average molecular weight in the range of 1,000 to about 15,000, containing about 0.7 to about 3.5 units of alpha-beta olefinic unsaturation per 1,000 units molecular weight, and being further characterized in that its longest carbon-to-carbon chain is a copolymer wherein at least above 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 95 to 5 weight percent of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxy alkyl acrylate selected from the group consisting of hydroxyethyl acrylate, hydroxyethyl methacrylate, hydroxypropyl acrylate, and hydroxypropyl methacrylate, said particle of crosslinked acrylic polymer consisting essentially of (1) a minor and crosslinking amount of a di- or trifunctional monomers selected from the group consisting of divinyl benzene, a diester of acrylic or methacrylic acid and a $C_2$–$C_6$ dihydric alcohol or a triester of acrylic or methacrylic acid and a $C_2$–$C_6$ trihydric alcohol, said minor and crosslinking amount not exceeding about 20 mole percent of the constituent monomers of the crosslinked acrylic polymer, and (2) a remainder consisting essentially of a monoacrylate component which consists essentially of about 65 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, said remainder constituting at a minimum about 80 mole percent of the constituent monomers of the crosslinked acrylic polymer, and (II) crosslinking said film upon said substrate by exposing said substrate to a beam of electrons having average energy in the range of about 100,000 to about 500,000 electron volts.

References Cited

UNITED STATES PATENTS

| | | | |
|---|---|---|---|
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 117—93.31 |

PAUL LIEBERMAN, Primary Examiner

U.S. Cl. X.R.

260—77.5 CR, 77.5 TB, 836, 859 R, 876 R, 885, 886